Figures 1, 2:
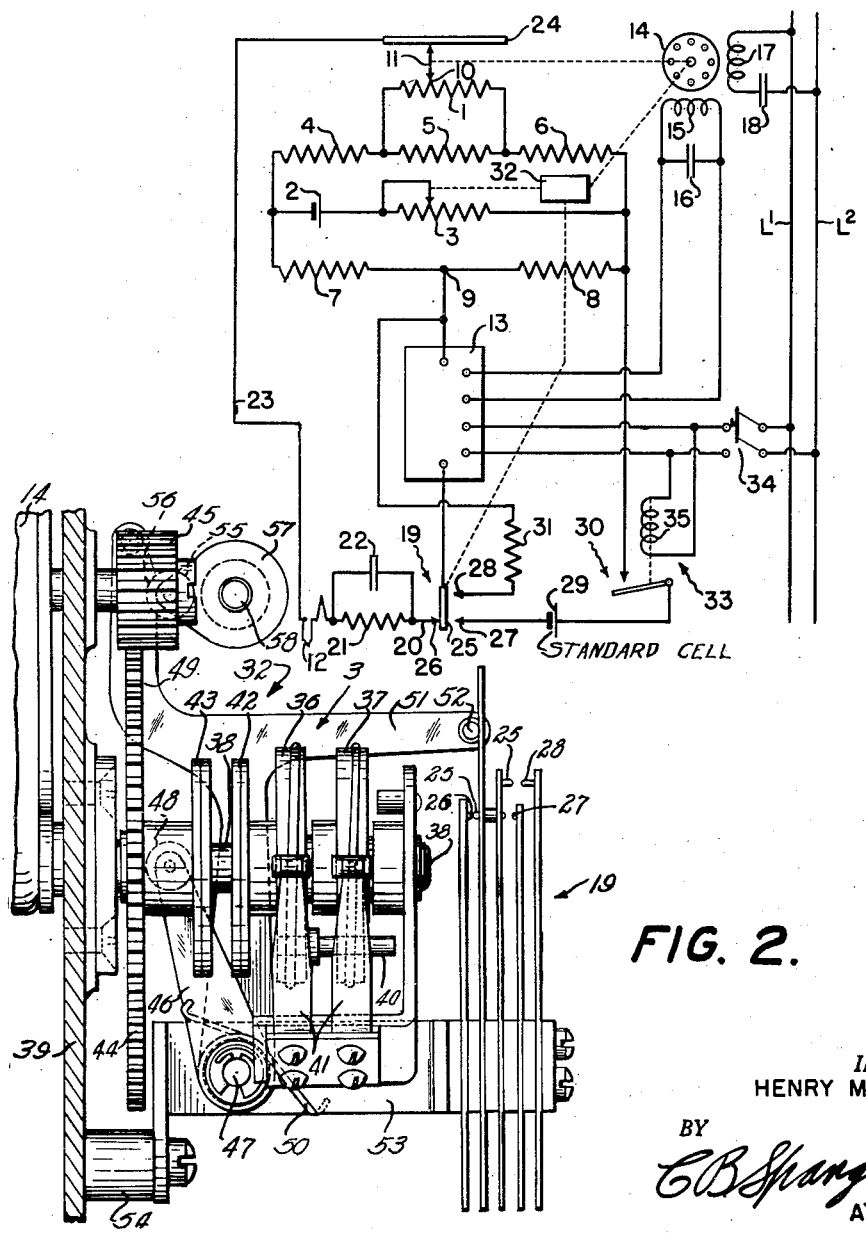

July 30, 1946.  H. M. SCHMITT  2,404,891

CONTROL APPARATUS

Filed March 25, 1943

INVENTOR.
HENRY M. SCHMITT
BY
C. B. Spangenberg
ATTORNEY.

Patented July 30, 1946

2,404,891

UNITED STATES PATENT OFFICE 2,404,891

CONTROL APPARATUS

Henry M. Schmitt, Glenside, Pa., assignor to The Brown Instrument Company, Philadelphia, Pa., a corporation of Pennsylvania Application March 25, 1943, Serial No. 480,582

6 Claims. (Cl. 175—183)

The present invention relates to the art of electrical measurements, and particularly to measuring instruments of the potentiometric type for measuring and utilizing for control and analogous purposes minute direct current potentials, such for example, as those derived from thermocouples in measuring temperatures or from photo-voltaic or hydrogen ion cells in measuring other quantities or qualities.

A general object of the invention is to provide in a potentiometer instrument employing a standard cell for recalibrating or standardizing purposes, automatically operable means for preventing excessive drain from and resulting damage to the standard cell in the event the standard cell is operatively connected in circuit when the instrument is rendered inoperative whether voluntarily, as by disconnection of the instrument from the energizing source, or involuntarily, as by failure of said source.

It is customary in measuring and controlling instruments of the potentiometric type to provide a battery or dry cell for energizing the measuring circuit to produce the potential of known magnitude to which the potential under measurement is compared. For many years batteries have been employed for this purpose and have proven to be satisfactory in operation. The voltage output of batteries gradually decreases with age and use, however, and therefore, it is necessary in the interest of accuracy of measurement to frequently check the output voltage of the battery against a known standard. A standard cell is usually employed as the known standard and maintains an output voltage which is constant to a high degree of accuracy over a long period of time provided that little or no current is drained from the standard cell.

In many potentiometric instruments which are commercially available, the output voltage of the battery and that of the standard cell are intermittently compared by automatically operating means, and upon change in the output voltage of the battery, the value of a calibrating rheostat is adjusted as required to compensate for the change in the battery output voltage. In the normal use of such apparatus there are extended periods during which the apparatus is rendered inoperative according to plan and during these periods current will drain from the standard cell if the apparatus is then adjusted to its standardizing condition and if the potentiometric network is not exactly calibrated. Such current drain may cause an objectionable decrease in the output voltage of the standard cell and thus terminate its usefulness as a standard cell. Damage to the standard cell may also occur as a result of failure of the electrical energizing source for the apparatus if the apparatus then happens to be adjusted to its standardizing condition.

It is a specific object of the invention to provide means for guarding against damage to the standard cell from such causes.

The various features of novelty which characterize my invention are pointed out with particularity in the claims annexed to and forming a part of this specification. For a better understanding of the invention, however, and the advantages possessed by it, reference should be had to the accompanying drawings and descriptive matter in which I have illustrated and described a preferred embodiment of the invention.

Fig. 1 is a diagrammatic illustration of a potentiometric instrument embodying the principles of the present invention; and Fig. 2 is a detailed illustration of a portion of the apparatus shown in Fig. 1.

In Fig. 1 of the drawing there is illustrated, more or less diagrammatically, a self-balancing measuring instrument of the split potentiometric type for measuring the value of a variable condition, as for example, the temperature within the interior of a furnace which has not been shown in order to avoid complication of the drawing. The potentiometer circuit includes a slidewire resistance 1 across which a potential drop of predetermined value is produced by the flow of current therethrough from a battery 2. The battery 2 is preferably in the form of a dry cell. A variable resistance 3 is connected in circuit with the battery 2 and is provided for the purpose of adjusting the current flow through the slidewire resistance 1 from the battery 2 as is required to maintain the potential drop across the slidewire 1 constant at a predetermined value. Such adjustment is desirable because the output voltage of the battery 2 varies according to changes in variable and unpredictable factors such as age and ambient temperature.

The potentiometric network includes three resistances 4, 5 and 6 connected in series in one branch. The resistance 5 is connected in parallel with the slidewire resistance 1. The resistances 4, 5 and 6 are preferably formed of manganin wire, having a substantially zero temperature coefficient of resistance, and are utilized for calibration purposes. The slidewire resistance 1 also is preferably formed of manganin wire. Connected in parallel with the resistances 4, 5 and 6 are two resistances 7 and 8 which are connected in series and comprise a second branch of the potentiometric circuit. The resistance 7 is preferably made of nickel, copper or other material having a positive temperature coefficient of resistance, and the resistance 8 may be formed of manganin wire having a substantially zero temperature of coefficient of resistance.

The battery 2 and variable resistance 3 are connected in series and comprise a third branch of the potentiometric circuit. The battery 2 causes a current flow through the first and second mentioned circuit branches to create a D. C. potential between the point 9 intermediate the resistances 7 and 8 and the point 10 comprising the point of engagement of a movable contact 11 with the slidewire resistance 1. This potential between the potentiometric points 9 and 10 is variable in magnitude depending upon the position of the contact 11 along the length of the slidewire resistance 1. The potentiometric circuit is so designed and so provided with a suitable scale or chart that the potential derived between the points 9 and 10 constitutes a potential of known magnitude or at least constitutes a known measurement of the magnitude of a variable condition such, for example, as temperature.

The electromotive force from a thermocouple 12 which is subjected to a variable temperature, the magnitude of which it is desired to ascertain, is connected in opposition to the potential produced between the potentiometric circuit points 9 and 10 in series with an electronic device 13 which operates to detect any differences in magnitude of the opposed potentials. As the temperature to which the thermocouple 12 is subjected changes, the potentiometer circuit is unbalanced, that is, one or the other of the opposed potentials predominates and causes a flow of current in one direction or the other through the input circuit of the electronic device 13 which is operative to detect such current flows and selectively energizes a reversible rotating field motor 14 for rotation in one direction or the other to shift the contact 11 along the slidewire resistance 1 in the proper direction and by the right amount to rebalance the potentiometer circuit, or in other words, to restore a state of equality between the opposed potentials.

The electronic device 13 may be of the type disclosed in the copending application of Walter P. Wills, Serial No. 421,173 which was filed December 1, 1941, and therefore, a detailed description thereof need not be given herein. Suffice it to say that the electronic device 13 includes an interrupter or vibrator and a cooperating transformer for converting the unbalanced current flows resulting from the opposed potentials into an alternating current flow of one phase or of opposite phase depending upon the direction of potentiometric unbalance. The electronic device 13 also includes an amplifier which is utilized to amplify the derived current, and the amplified quantity is impressed upon one phase winding 15 of the reversible electrical motor 14. A tuning condenser 16 of suitable value is connected in parallel with the winding 15. The motor 14 is provided with a second phase winding 17 which is connected to the alternating current supply lines $L^1$ and $L^2$ through a condenser 18 of suitable value. Upon unbalance of the potentiometric network in one direction, the alternating current flow through the phase winding 15 will lead the alternating current flow through the phase winding 17, and the motor 14 will then be actuated for rotation in the proper direction to rebalance the potentiometer circuit. Similarly, upon unbalance of the potentiometer circuit in the opposite direction, the alternating current flow through the phase winding 15 will lag that through the phase winding 17 and consequently the motor 14 will be energized for rotation in the opposite direction, again effecting rebalance of the potentiometric network.

The thermocouple 12 is normally connected to the potentiometer circuit points 9 and 10 through a circuit which may be traced from the potentiometric circuit point 9 through the input circuit of the electronic device 13, a switch 19, a conductor 20 in which a resistance 21 shunted by a condenser 22 is inserted, thermocouple 12, a conductor 23, a collector bar 24 and contact 11 to the potentiometric circuit point 10. The switch 19 includes a movable contact member 25 which is connected to one input terminal of the electronic device 13 and also a relatively stationary contact 26 which is connected to the conductor 20. The switch 19 is also provided with a pair of relatively stationary contacts 27 and 28. In the normal operating condition of the potentiometer instrument, the member 25 of the switch 19 is held in engagement with the relatively stationary contact 26. Periodically, however, the movable member 25 is adjusted away from the contact 26 and moved into engagement with the relatively stationary contacts 27 and 28. This adjustment of the switch 19 is made for the purpose of periodically standardizing or recalibrating the potentiometer circuit. This operation is accomplished by first ascertaining whether the potential drop across the slidewire resistance 1 is the proper value, and if it is not, the reversible motor 14 is then operated and connected to the variable resistance 3 for adjusting the latter as is required to restore the desired potential drop across the slidewire resistance 1.

A standard cell 29 which produces a substantially constant source of potential is utilized during this standardizing or recalibrating operation for the purpose of ascertaining whether the potential drop across the slidewire resistance 1 is the correct value. The standard cell 29 has one terminal connected to the relatively stationary contact 27 and has its other terminal connected through a switch 30 to the right end of the potentiometric resistance 8. The standard cell 29 is so connected in the circuit that its potential is in opposition to the potential drop across the resistance 8. The circuit in which these opposed potentials are connected may be traced from the lower input terminal of the electronic device 13 to the movable member 25 of the switch 19, the relatively stationary contact 27, the standard cell 29, the switch 30, which during normal operation of the potentiometric instrument is in a closed position, resistance 8 to the potentiometric circuit point 9 and from that point to the other input terminal of the electronic device 13. When the potential drop across the resistance 8 is exactly equal and opposite to the potential of the standard cell 29, the potentiometric instrument is correctly calibrated and the potential drop across the slidewire resistance 1 is then the desired value. When the potential drop across the resistance 8 is not equal to the potential of the standard cell 29, the potentiometric circuit is not properly calibrated and the electronic device 13 is operative to detect the difference between the opposed potentials and energizes the reversible electrical motor 14 for rotation in the proper direction to effect adjustment of the variable resistance 3 as is required to restore the potentiometric network to its proper condition of calibration.

Because of the fact that the output voltage of the battery 2 changes with use and changes with unpredictable factors such as the ambient temperature to which it is subjected, it is necessary to adjust the variable resistance 3 from time to time in order to maintain the desired calibration of the potentiometric instrument. At such times as the instrument is to be recalibrated or standardized, the movable contact 25 of the switch 19 is shifted out of engagement with the stationary contact 26 and into engagement with contact 27, thus effecting disconnection of the thermocouple 12 from the circuit and connection of the standard cell 29 in opposition to the potential drop across the resistance 8. Simultaneously, the movable member 25 of switch 19 engages the stationary contact 28 to connect a resistance 31 in shunt to the input terminals of the electronic device 13. The resistance 31 is utilized for the purpose of desensitizing the electronic device 13 because the opposed potential drops connected to the input circuit of device 13 when the instrument is in its standardizing position are of much greater magnitude than are the opposed potential drops which are impressed upon the input circuit of the device 13 when the instrument is in its normal measuring condition. Consequently, the extreme sensitivity of the electronic device 13 required in the normal measuring condition of the potentiometer is not required nor desired in the recalibrating or standardizing position of the instrument.

Simultaneous with the adjustment of switch member 25 into engagement with contacts 27 and 28, the output shaft of the reversible motor 14 is connected to the variable resistance 3 for effecting adjustment of the latter in accordance with the angular position of said shaft. To this end, a clutch mechanism indicated generally by the reference character 32 is provided between the output shaft of motor 14 and the resistance 3. The clutch mechanism 32 may be of the type disclosed in the copending application, Serial No. 480,581 of A. F. Allwein filed concurrently herewith and issued into Patent 2,377,474 on June 5, 1945. Such clutch mechanism is illustrated in detail in Fig. 2.

Although the clutch mechanism 32 forms no part of the present invention, it is described in detail herein. At this point, it is sufficient to note that in the normal measuring condition of the potentiometric instrument, the output shaft of the reversible motor 14 is connected to the contact 11 for adjusting the latter along the length of the slidewire resistance 1. The rotation of the reversible motor 14 accomplishing this result does not during this condition of operation produce any adjustment of the variable resistance 3. The clutch mechanism 32 includes time operated mechanism, however, which periodically shifts the movable member 25 of the switch 19 out of engagement with contact 26 and into engagement with the contacts 27 and 28 and simultaneously connects the output shaft of the motor 14 to the variable resistance 3. This is the standardizing condition of the potentiometric instrument. If the potential drop across the resistance 8 is then not exactly equal to the potential of the standard cell 29, indicating that the potentiometric network needs recalibration, the electronic device 13 detects such inequality of the opposed potentials and causes selective energization of the reversible motor 14 for rotation to effect adjustment of the variable resistance 3 in the proper direction to restore the correct calibration condition of the potentiometric instrument. The motor 14 also operates to adjust the contact 11 along the slidewire resistance 1 during this time, but such adjustment in no way affects the standardizing operation inasmuch as the thermocouple circuit is then opened at the switch 19.

In order to prevent excessive drain from the standard cell 29 and thereby to prolong the life of the latter, a relay 33 which operates the switch 30 is utilized as shown in the drawing for opening the standard cell circuit when the potentiometric instrument is disconnected from the alternating current supply lines $L^1$ and $L^2$, as by opening the manually operated switch 34, and also upon failure of the alternating current supply while the apparatus is in operation. To this end, the operating coil 35 of the relay 33 is connected to the alternating current supply lines $L^1$ and $L^2$ through the manually operated switch 34. The manually operated switch 34 is provided for connecting the energized terminals of the electronic device 13 to the alternating current supply lines $L^1$ and $L^2$ and when closed also connects the operating coil 35 of the relay 33 thereto. When the switch 34 is closed, the relay 33 holds the switch 30 closed to thereby complete the standardizing circuit including the resistance 8 and the standard cell 29. When the switch 34 is opened to deenergize the potentiometric apparatus, however, the switch 30 opens to open the circuit including the standard cell. This action precludes the possibility of the standard cell 29 being connected in a closed circuit with the resistance 8 for an extended period if the switch 19 had then been adjusted to its standardizing position. If the standard cell 29 were permitted to be connected in the circuit during such extended interval, excessive drain therefrom would result with the consequence that the output voltage of the standard cell 29 would be changed from its normal value. This would effectively render the standard cell 29 useless for its intended purpose. Disconnection of the standard cell from the closed circuit including the resistance 8 will also be effected if the alternating voltage provided by the supply lines $L^1$ and $L^2$ should fail while the switch 34 is in its closed position.

The provision of the relay 33, as shown, is particularly desirable in view of the fact that there is normally little or no drain from the standard cell 29, the potential drop across the resistance 8 always being substantially equal to the voltage of the standard cell 29 when the standardizing operation is effected at suitably frequent intervals. When so used, the standard cell may have a very long life. The provision of relay 33 guarantees that the standard cell 29 will only be subjected to such normal use in that the standard cell 29 is immediately disconnected from the circuit including the resistance 8 when the potentiometric instrument has been disconnected from the alternating current supply lines $L^1$ and $L^2$ or when the power supply has failed.

In Fig. 2 is shown the details of the clutch mechanism 32 of Fig. 1. In Fig. 2 the standardizing resistance 3 is shown as consisting of a vernier rheostat which is made of a fine resistance 36 and a coarse resistance 37, which resistances are rotatably mounted on a shaft 38 that extends rearwardly from the mounting wall 39 which supports the mechanism. The parts are so arranged that the fine resistance is adjusted directly and the coarse resistance is rotated by the fine resistance by means of a pin 40 which is attached to the support for the fine resistance 36 and extends rearwardly therefrom through a slot which is formed in the resistance 37. The resistances are engaged by a split contact 41 which serves the purpose of connecting these resistances in the potentiometric circuit and due to its frictional engagement with the resistance disks also serves to prevent accidental rotation of the latter.

The resistances are adjusted relatively to the contact 41 by means of a clutch which comprises a driven clutch disk 42 that is formed as a part of the resistance 36, and a driving clutch disk 43 which is also rotatably mounted on the shaft 38, and is attached to a gear 44. The gear 44 meshes with a pinion 45 driven by the motor 14 so that as the latter rotates the gear and the driving disk 43 also rotate and at predetermined times when the clutch disks 42 and 43 are in engagement with each other, serves to adjust the resistance 3. Driving disk 43 is moved into or out of engagement with driven disk 42 by means of a lever 46 that is attached to a shaft 47. The upper end of this lever has a roller 48 which engages the left face of the clutch disk to move this disk to the right into engagement with the disk 42, or engages the right face of gear 44 to separate the disks. During the movement of the disk 43, gear 44 will slide along the pinion 45, the latter being wide enough to permit this to take place. The shaft 47 also has attached to it a second lever 49; the two levers and shaft being biased in a clockwise, or clutch closing direction by means of a spring 50. The lever 49 also has an extension 51 projected rearwardly from it which serves, by means of a pin 52, to throw the standardizing switch 19 from the position shown in Figs. 1 and 2 to a position to bring contact 25 into engagement with contacts 27 and 28 whenever the clutch is closed. The switch 19 is shown in Fig. 2 as being of a leaf type, and is mounted on a support 53 which is adapted to be fastened as shown at 54, to the wall 39 of the mounting.

Normally, during the operation of the instrument, the standardizing mechanism parts are in a position shown in Figs. 1 and 2, and are held in that position by means of engagement between a roller 55 and a cut out portion 56 on the upper end of the lever 49. The roller 55 is mounted on a crank 57 that is attached to a shaft 58. This shaft 58 is periodically rotated, by any one of a number of suitable means. Such means, suitable for causing the shaft 58 to make and complete a rotation at regularly recurring intervals are well known to those skilled in the art, and need not be described in detail here since they form no part of the present invention. It is, therefore, only necessary to state here that the shaft 58 is periodically given a complete rotation, during which rotation the standardizing switch 19 is shifted to its standardizing position and the clutch plates 42 and 43 are held together so that the motor 14 is made operative to adjust the resistance 3 if such adjustment is necessary to obtain a balance of the potentiometric system, indicating proper instrument calibration.

While in accordance with the provisions of the statutes, I have illustrated and described the best forms of embodiment of my invention now known to me, it will be apparent to those skilled in the art that changes may be made in the form of the apparatus disclosed without departing from the spirit of my invention as set forth in the appended claims and that in some cases certain features of my invention may be used to advantage without a corresponding use of other features.

Having now described my invention, what I claim as new and desire to secure by Letters Patent is as follows:

1. The combination with a split potentiometer circuit having a branch including a slidewire resistance, a second branch including a source of current and a variable resistance, and a third branch including a fixed resistance, of a device to vary said variable resistance, a source of substantially constant potential, a connection between said source of substantially constant potential and said fixed resistance to oppose the potential of said substantially constant potential to the potential drop across said fixed resistance, periodically operating means to actuate said device to maintain said opposed potentials equalized, energizing terminals for said periodically operating means adapted to be connected to energizing means, and means connected to said energizing terminals to open said connection upon said energizing means becoming ineffective to energize said periodically operating means.

2. The combination with a potentiometer circuit comprising a slidewire resistance, and a variable resistance, of a device to vary said last mentioned resistance, a source of substantially constant potential, a circuit including said slidewire resistance and said source of substantially constant potential, means periodically connected in said circuit to compare the potential drop across said slidewire resistance to the potential of said substantially constant potential and operative at such times to actuate said device as required to maintain a constant potential drop across said slidewire resistance, energizing terminals for said periodically operating means adapted to be connected to energizing means, and means connected to said energizing terminals to disconnect said source of substantially constant potential from said second mentioned circuit upon said energizing means becoming ineffective to energize said periodically operating means.

3. The combination with a potentiometric circuit comprising a slidewire resistance, and a variable resistance, of a device to vary said last mentioned resistance, a source of substantially constant potential, periodically operating means to compare the potential drop across said slidewire resistance to the potential of said source of substantially constant potential and operative at such times to actuate said device as required to maintain a constant potential drop across said slidewire resistance, energizing terminals for said periodically operating means adapted to be connected to energizing means, and means connected to said energizing terminals to prevent the flow of current from said source of substantially constant potential upon failure of said energizing means.

4. The combination with a split potentiometer circuit having a branch including a slidewire resistance, a second branch including a source of current and a variable resistance, and a third branch including a fixed resistance, of a device to vary said variable resistance, a source of substantially constant potential, means connecting said source of substantially constant potential to said fixed resistance to oppose the potential of said substantially constant potential to the potential drop across said fixed resistance, means operative to actuate said device to maintain said opposed potentials equalized, energizing terminals for said operative means adapted to be connected to energizing means, and means connected to said energizing terminals to open the connection between said substantially constant potential and said fixed resistance upon said energizing means becoming ineffective to energize said operative means.

5. The combination with a potentiometer circuit comprising a slidewire resistance, and a variable resistance, of a device to vary said last mentioned resistance, a source of substantially constant potential, a circuit including said slidewire resistance and said source of substantially constant potential, means connected in said circuit to compare the potential drop across said slidewire resistance to the potential of said substantially constant potential and operative to actuate said device to maintain a constant potential drop across said slidewire resistance, energizing terminals for said operative means adapted to be connected to energizing means, and means connected to said energizing terminals to disconnect said source of substantially constant potential and said second mentioned circuit upon said energizing means becoming ineffective to energize said operative means.

6. The combination with a potentiometer circuit comprising a slidewire resistance, and a variable resistance, of a device to vary said last mentioned resistance, a source of substantially constant potential, means operative to compare the potential drop across said slidewire resistance to the potential of said source of substantially constant potential and operative to actuate said device to maintain a constant potential drop across said slidewire resistance, energizing terminals for said operative means adapted to be connected to energizing means, and means connected to said energizing terminals to prevent the flow of current from said source of substantially constant potential upon said energizing means becoming ineffective to energize said operative means.

HENRY M. SCHMITT.